United States Patent
Hosono et al.

(10) Patent No.: US 8,355,723 B2
(45) Date of Patent: Jan. 15, 2013

(54) MOBILE COMMUNICATION METHOD AND EXCHANGE STATION

(75) Inventors: Hiroyuki Hosono, Yokohama (JP); Akira Ishii, Yokosuka (JP); Masafumi Masuda, Yokosuka (JP); Kenichiro Aoyagi, Yokosuka (JP); Yasuhiro Kawabe, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 13 days.

(21) Appl. No.: 12/996,483

(22) PCT Filed: Jun. 5, 2009

(86) PCT No.: PCT/JP2009/060390
§ 371 (c)(1),
(2), (4) Date: Feb. 25, 2011

(87) PCT Pub. No.: WO2009/148167
PCT Pub. Date: Dec. 10, 2009

(65) Prior Publication Data
US 2011/0150041 A1 Jun. 23, 2011

(30) Foreign Application Priority Data
Jun. 6, 2008 (JP) .................................. 2008-149970

(51) Int. Cl.
*H04Q 7/20* (2006.01)

(52) U.S. Cl. ......... 455/438; 455/436; 455/418; 370/331
(58) Field of Classification Search .................. 455/438, 455/436, 418; 370/331
See application file for complete search history.

(56) References Cited

U.S. PATENT DOCUMENTS

| 6,571,097 | B1* | 5/2003 | Takai .............................. 455/436 |
| 2006/0034229 | A1* | 2/2006 | Joo et al. ....................... 370/335 |
| 2006/0126577 | A1* | 6/2006 | Yano et al. ..................... 370/337 |
| 2007/0054668 | A1  | 3/2007 | Scheinert et al. |
| 2008/0026726 | A1* | 1/2008 | Tariq et al. .................... 455/411 |
| 2008/0259801 | A1* | 10/2008 | Kim et al. ..................... 370/235 |

FOREIGN PATENT DOCUMENTS
JP 10 215474 8/1998
(Continued)

OTHER PUBLICATIONS
International Search Report issued Jul. 14, 2009 in PCT/JP09/60390 filed Jun. 5, 2009.
"Requirements for LTE Home eNodeBs" Orange, Telecom Italia, T-Mobile, Vodafone, 3GPP TSG RAN #35, 4 pages, (Mar. 2007).
(Continued)

*Primary Examiner* — Danh Le
(74) *Attorney, Agent, or Firm* — Oblon, Spivak, McClelland, Maier & Neustadt, L.L.P.

(57) ABSTRACT

A mobile communication method according to the present invention includes step of causing a mobile station 300 standing by in a cell under a control of a radio base station 202 to send identification information of the mobile station and special identification information; step of, upon receipt of the special identification information, determining whether or not the mobile station 300 has access permission to a radio base station 200 based on the received identification information of the mobile station 300 and identification information of a second radio base station; and step of, when it is determined that the mobile station 300 has access authorization to the radio base station 200, instructing the mobile station 300 to change a radio communication parameter used by the mobile station 300.

15 Claims, 6 Drawing Sheets

FOREIGN PATENT DOCUMENTS

| | | |
|---|---|---|
| JP | 2006-211168 | 8/2006 |
| JP | 2007-534227 | 11/2007 |
| WO | 2005 065214 | 7/2005 |
| WO | 2006 067643 | 6/2006 |

OTHER PUBLICATIONS

Office Action issued Apr. 24, 2012 in Japanese Patent Application No. 2010-515948 (with English translation).

* cited by examiner

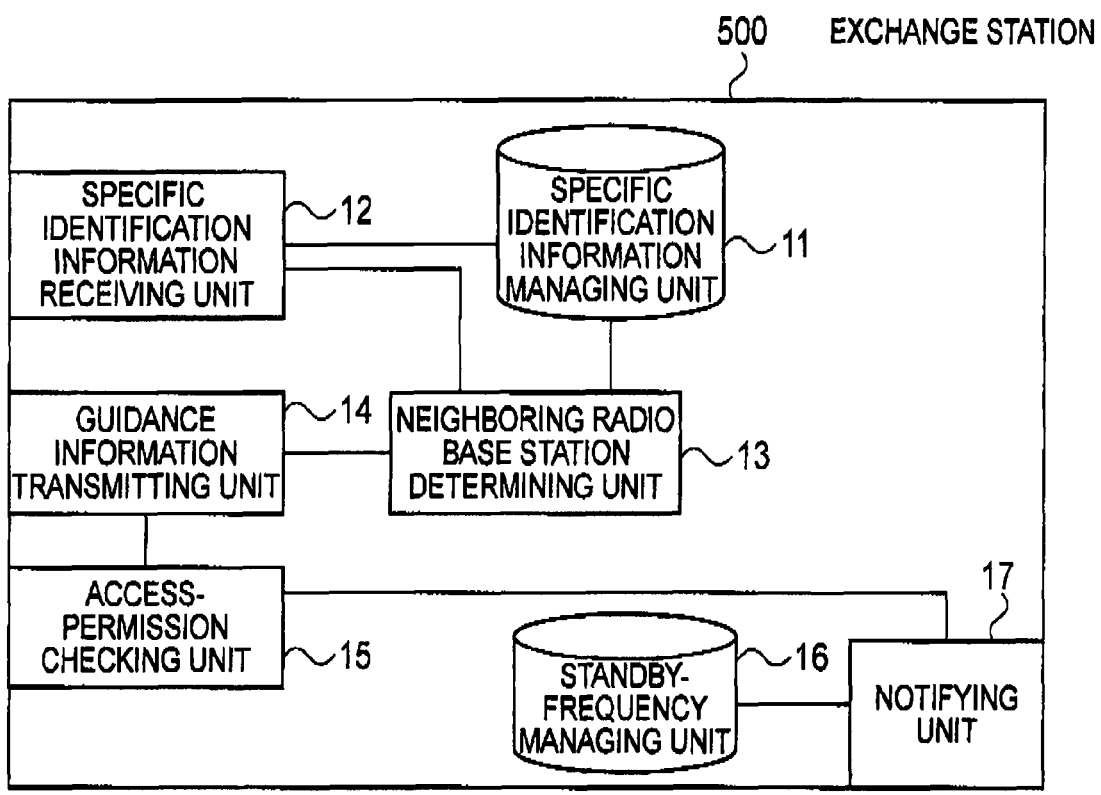

FIG. 4

| MOBILE STATION | CONNECTABLE RADIO BASE STATION |
|---|---|
| 300 | 200, 201 |
| .. | .. |

FIG. 5

| RADIO BASE STATION ID | STANDBY FREQUENCY |
|---|---|
| 200 | #0 |
| 201 | #1 |
| 202 | #2 |

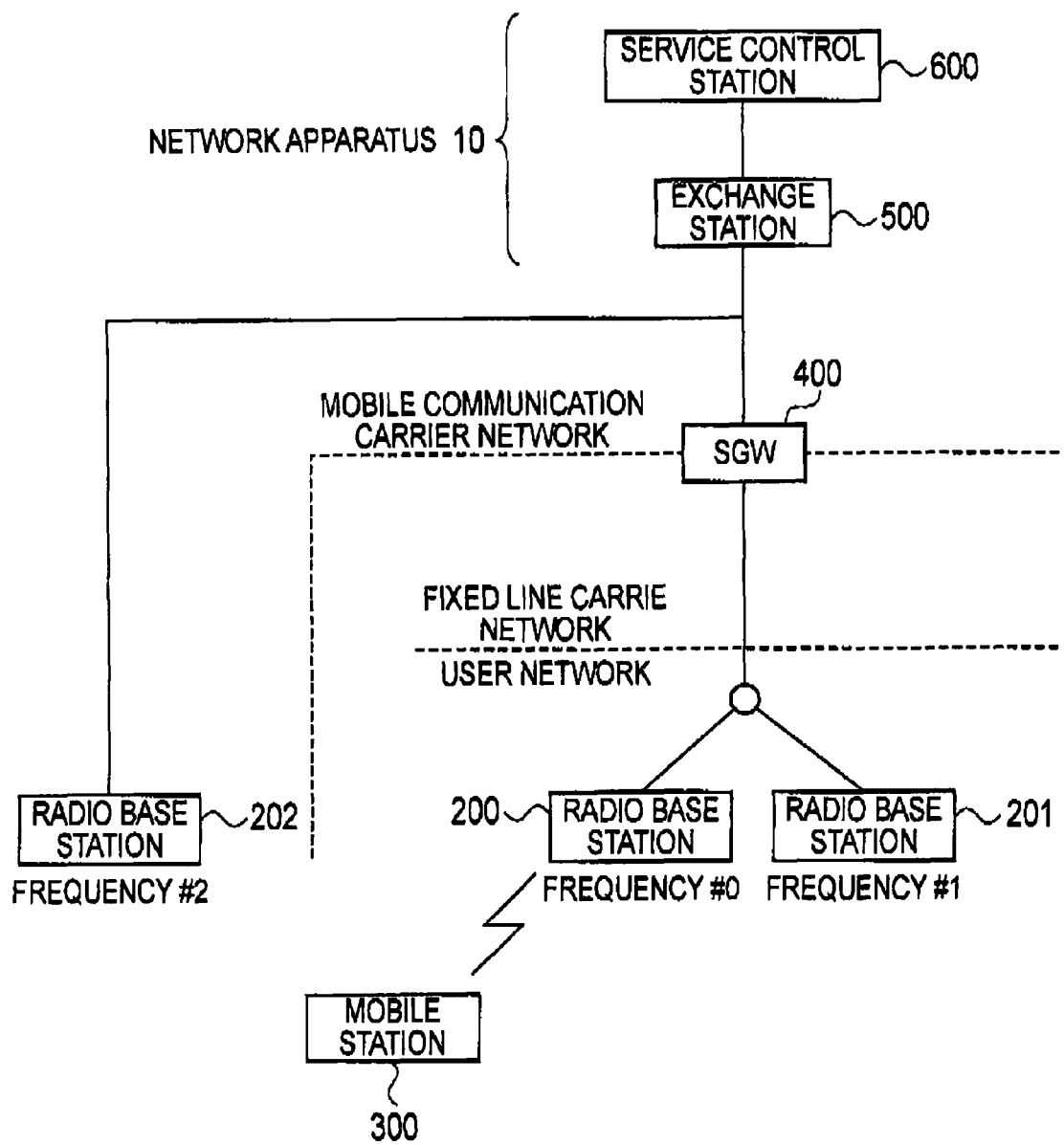

MOBILE COMMUNICATION METHOD AND EXCHANGE STATION

TECHNICAL FIELD

The present invention relates to a mobile communication method and an exchange station.

BACKGROUND ART

In the contemporary mobile phone business field, the introduction of super-small radio base stations for specified users are being considered and proposed so as to achieve "FMS (Fixed Mobile Substation) service" aiming to gain profitability from the fixed phone market by specific users to use mobile phones in place of fixed phones.

Cells managed by such private, super-small radio base stations for specified users are collectively called "femtocells."

To avoid interference with a cell managed by a general radio base station constituting an existing public communication network (referred to as a "macro cell" for convenience), the femtocell is sometimes operated at a frequency different from that of the macro cell.

In a mobile communication system using a WCDMA scheme, a mobile station using a macro cell does not measure control signals of other frequencies unless the reception quality of all the control signals of a currently-used frequency becomes or falls below a certain value.

This brings about a problem that the mobile station cannot find the femtocell and therefore cannot use the femtocell even when it is better for the mobile station to use preferentially the femtocell for such reasons as performing high-speed communication and receiving a better charge rate.

Several methods are under consideration as countermeasures for such a problem.

One of those methods is to differentiate between a "PLMN-ID (Public Land Mobile Network-Identifier)" for a femtocell and a "PLMN-ID" for a macro cell.

In this method, the femtocell "PLMN-ID" is given higher priority than the macrocell "PLMN-ID," and a mobile station finds the femtocell by periodically measuring control signals of the frequency of the femtocell.

However, in order for the mobile station to rapidly find the femtocell, the interval for measuring the frequency of the femtocell needs to be short. This leads to a problem of power consumption by the mobile station.

Further, in another method under consideration, the mobile station itself determines the timing for measuring the control signals of the femtocell based on the IDs of a macro cell and a location registration area, respectively, in both of which the mobile station is located.

In this method, the mobile station stores therein the IDs of a macro cell and a location registration area that overlay a femtocell to which the mobile station is permitted to connect. Then, the mobile station measures the control signals of the frequency of the femtocell when a macrocell ID and a location registration area ID broadcasted by the macrocell match the macro cell ID and the location registration area ID that are stored in the mobile station.

In this way, the area for which the mobile station measures the control signals of the frequency of the femtocell is restricted; therefore, the problem of power consumption by the mobile station can be solved.

SUMMARY OF INVENTION

However, in order to spread the femtocells purchased and installed by users, it is important to support mobile stations that are already in market.

In this regard, in the method described above, mobile stations need to be additionally equipped with such mechanisms as storing the IDs of a macro cell and the location registration area which overlay a femtocell in the mobile station and checking the macrocell ID and the location registration area ID thus stored against the macrocell ID and the location registration area ID received from the macrocell.

Moreover, whether the method of differentiating between the "PLMN-ID" of a femtocell and the "PLMN-ID" of a macrocell can be implemented or not is unknown due to a problem in legal systems.

Accordingly, the present invention has been made in consideration of the above problems, and has an objective to provide a mobile communication method and an exchange station by which, in a mobile communication system having femtocells, a mobile station already in market can find a femtocell of a frequency different from a currently-used frequency.

The first feature of the present invention is summarized in that a mobile communication method including step A of causing a mobile station standing by in a cell under a control of a first radio base station to send identification information of the mobile station and special identification information; step B of, upon receipt of the special identification information, determining whether or not the mobile station has access permission to a second radio base station based on the received identification information of the mobile station and identification information of the second radio base station; and step C of instructing the mobile station to change a radio communication parameter used by the mobile station when it is determined that the mobile station has access authorization to the second radio base station.

In the first feature of the present invention, the step 13 may include step B1 of, upon receipt of the special identification information, causing an exchange station to send a service control station the received identification information of the mobile station and the identification information of the second radio base station; and step B2 of causing the service control station to determine whether or not the mobile station has access authorization to the second radio base station based on the received identification information of the mobile station and the identification information of the second radio base station.

In the first feature of the present invention, in the step B1, the exchange station may determine whether the second radio base station is a neighboring base station of the first radio base station, if determining that the second radio base station is a neighboring base station of the first radio base station, the exchange station may send the service control station the identification information of the mobile station and the identification information of the second radio base station, and if determining that the second radio base station is not a neighboring base station of the first radio base station, the exchange station may send the mobile station a specific guidance.

In the first feature of the present invention, in the step B1, upon receipt of the specific identification information, the exchange station may send the service control station the received identification information of the mobile station and the identification information of the second radio base station in association with any one of the special identification information and identification information of the first radio base station.

In the first feature of the present invention, in the step C, the exchange station may instruct the mobile station to update the radio communication parameter from a radio communication parameter used in radio communication with the first radio base station to a radio communication parameter to be used in radio communication with the second radio base station.

In the first feature of the present invention, the radio communication parameter may be at least one of spreading code, frequency, and timing.

In the first feature of the present invention, the special identification information may be any one of a specific telephone number, a specific service code of "USSD (Unstructured Supplementary Service Data)," a specific URL, and a specific mail address.

The second feature of the present invention is summarized in that a network apparatus comprising a notifying unit configured to instruct a mobile station standing by in a cell under a control of a first radio base station to change a radio communication parameter used by the mobile station when specific identification information is received from the mobile station, and when it is determined that the mobile station has access authorization to a second radio base station based on the received identification information of the mobile station and identification information of the second radio base station.

In the second feature of the present invention, the network apparatus may further include an access-authorization checking unit configured to, when the special identification information is received from the mobile station, send a service control station the received identification information of the mobile station and the identification information of the second radio base station, and to receive a determination result indicating whether the mobile station has access permission to the second radio base station or not, from the service control station, wherein when the determination result received from the service control station indicates that the mobile station has access authorization to the second radio base station, the notifying unit may instruct the mobile station to change the radio communication parameter used by the mobile station.

In the second feature of the present invention, the network apparatus may further include a neighboring radio base station determining unit configured to determine whether the second radio base station is a neighboring base station of the first radio base station, and a guidance information transmitting unit configured to send the mobile station specific guidance when it is determined that the second radio base station is not a neighboring base station of the first radio base station, wherein when it is determined that the second radio base station is a neighboring base station of the first radio base station, the access-permission checking unit may send the service control station the identification information of the mobile station and the identification information of the second radio base station.

In the second feature of the present invention, upon receipt of the special identification information, the access-authorization checking unit may send the service control station the received identification information of the mobile station and the identification of the second radio base station in association with any one of the special identification information and the identification information of the first radio base station.

In the second feature of the present invention, the notification unit may instruct the mobile station to update the radio communication parameter from a radio communication parameter used in radio communication with the first radio base station to a radio communication parameter to be used in radio communication with the second radio base station.

In the second feature of the present invention, the radio communication parameter may be at least one of spreading code, frequency, and timing.

In the second feature of the present invention, the special identification information may be any one of a specific telephone number, a specific service code of "USSD (Unstructured Supplementary Service Data)," a specific URL, and a specific mail address.

The third feature of the present invention is summarized in that a radio base station operating as a first radio base station, comprising a notifying unit configured to instruct a mobile station standing by in a cell under a control of the first radio base station to change a radio communication parameter used by the mobile station when special identification information is received from the mobile station, and when it is determined that the mobile station has access permission to a second radio base station based on the received identification information of the mobile station and identification information of the second radio base station.

As described above, according to the present invention, it is possible to provide a mobile communication method and an exchange station by which, in a mobile communication system having femtocells, a mobile station already in market can find a femtocell of a frequency different from a currently-used frequency.

BRIEF DESCRIPTION OF DRAWINGS

FIG. 2 is a functional block diagram of an exchange station according to a first embodiment of the present invention.

FIG. 3 is a diagram showing an example of special identification information managed by a specific identification information managing unit of the exchange station according to the first embodiment of the present invention.

FIG. 4 is a diagram showing an example of access information managed by a service control station according to the first embodiment of the present invention.

FIG. 5 is a diagram showing an example of standby-frequency information managed by a standby-frequency managing unit of the exchange station according to the first embodiment of the present invention.

FIG. 8 is a diagram showing the overall configuration of a mobile communication system according to another modification of the present invention.

DESCRIPTION OF EMBODIMENT

Configuration of Mobile Communication System according to First Embodiment of Present Invention With reference to FIGS. 1 through 5, the configuration of a mobile communication system according to a first embodiment of the present invention is described. The mobile communication system according to the first embodiment of the present invention is a mobile communication system using a W-CDMA scheme.

Figure 1:
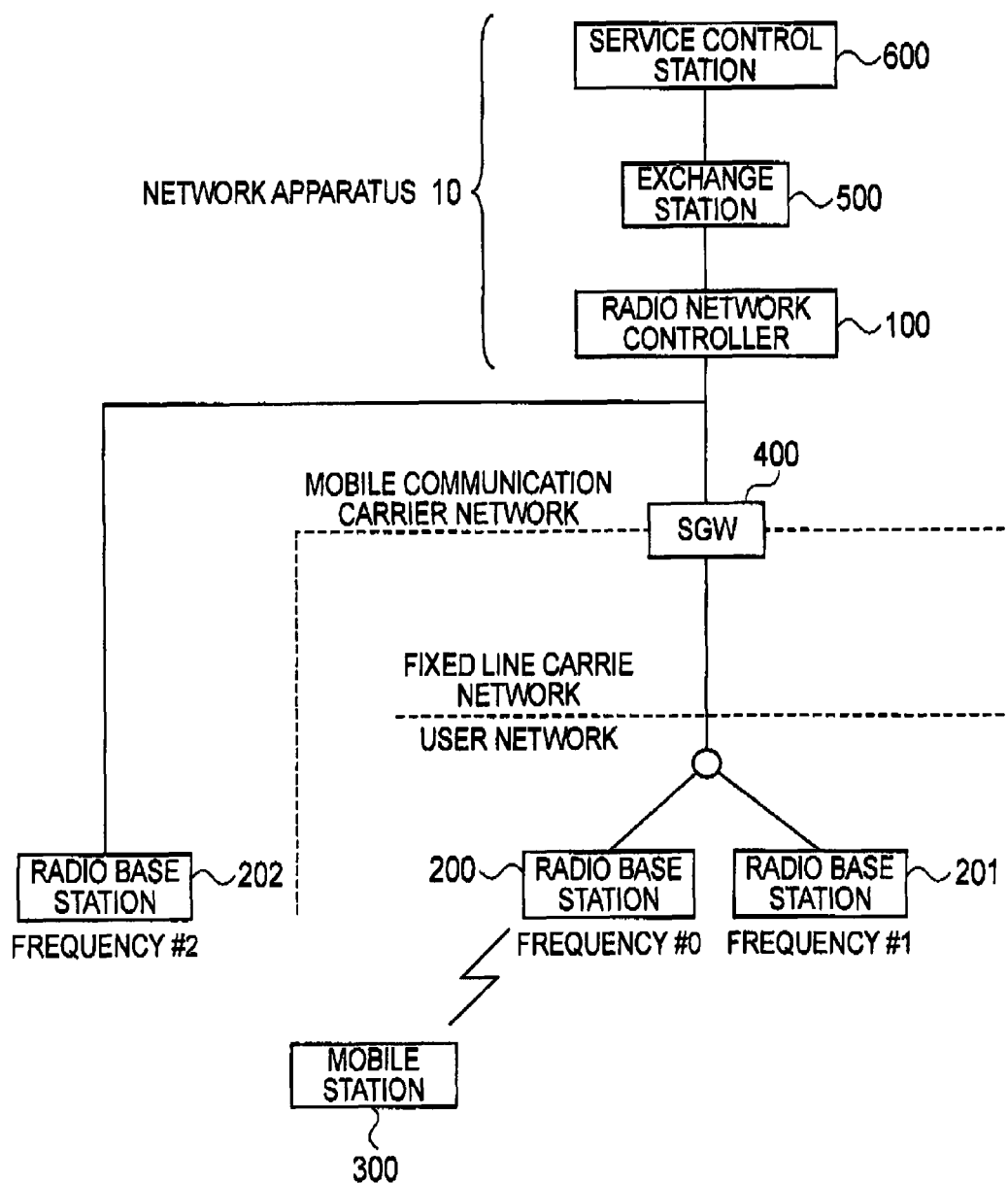
FIG. 1 is a diagram showing the overall configuration of a mobile communication system according to a first embodiment of the present invention.

As shown in FIG. 1, the mobile communication system according to the present embodiment includes a service control station 600, an exchange station 500, a radio network controller (RNC) 100, a security gateway (SGW) 400, and radio base stations 200 through 202.

Here, the radio base stations 200 to 202 are housed in the radio network controller 100. Further, the radio network controller 100 is configured to allocate radio communication parameters to the radio base stations 200 to 202, and to manage the radio communication parameters. The radio communication parameters are used in radio communication between a mobile station 300 and the radio base stations 200 to 202.

The radio base station 202 is a radio base station for public communication which is installed in a mobile communication carrier network managed by a mobile communication carrier. The radio base stations 200 and 201 are home radio base stations each managed by a user (the owner of the radio base station 200 or 201) subscribing to a communication service provided by a mobile communication carrier.

For example, each of the radio base stations 200 and 201 is installed in a LAN (Local Area Network) managed by the user mentioned above, and is connected to the radio network controller 100 on a mobile communication carrier network via a carrier network for FTTH or ADSL access.

On the other hand, the SGW 400 is installed on a border of the mobile communication carrier network. The SGW 400 is a gateway apparatus for protecting the mobile communication carrier network from unpermitted accesses from other networks, and is configured to pass only accesses authenticated through authentication procedures to the mobile communication carrier network.

Further, a mobile station that can access the radio base station 200 or 201 is only a specific one given access authorization thereto by the above-mentioned user.

The radio base station 202, on the other hand, is installed under the management of the mobile communication carrier, and any user of the mobile communication carrier can access the radio base station 202 without any particular restriction.

In the example shown in FIG. 1, the radio base stations 200 to 202 operate at frequencies different from one another, namely, at frequencies #0 to #2, respectively.

The mobile station 300 is a mobile station held by the above-mentioned user, and can communicate with the radio base stations 200 through 202. However, since the radio base stations 200 to 202 operate at different frequencies, even if the mobile station 300 in a cell under the control of a certain radio base station enters a cell under the control of a different radio base station, the mobile station 300 cannot autonomously search for the cell under the control of the different radio base station, and therefore cannot be in that cell.

The exchange station 500 is a packet communication exchange station or a line switching exchange station which is connected to the radio network controller 100 and the service control station 600.

Note that, in the mobile communication system according to the present embodiment, the service control station 600, the exchange station 500, and the radio network controller 100 are configured to operate as a network apparatus 10.

As shown in FIG. 2, the exchange station 500 includes a specific identification information managing unit 11, especial identification information receiving unit 12, neighboring radio base station determining unit 13, a guidance information transmitting unit 14, an access-authorization checking unit 15, a standby-frequency managing unit 16, and a notifying unit 17.

As shown in FIG. 3, the special identification information managing unit 11 is configured to store "special identification information," a "radio base station ID," and a "neighboring radio base station ID" in association with one another.

The "special identification information" is special identification information notified of by the mobile station 300 wishing to stand by in its home radio base station. The special identification information is, for example, a specific telephone number, a specific service code of "USSD (Unstructured Supplementary Service Data)," a specific URL, a specific mail address, or the like.

The "neighboring radio base station ID" is information identifying a neighboring radio base station of the radio base station specified by the "radio base station ID."

The special identification information receiving unit 12 is configured to receive the special identification information transmitted from the mobile station 300 currently standing by in a cell under the control of the radio base station 202 (a first radio base station) which is a public radio base station.

The neighboring radio base station determining unit 13 is configured as follows. Specifically, once the special identification information detecting unit 12 receives the special identification information transmitted from the mobile station 300, the neighboring radio base station determining unit 13 refers to the special identification information managing unit 11 to determine whether a second radio base station associated with the special identification information is a neighboring radio base station of the first radio base station currently used by the mobile station 300.

The access-authorization checking unit 15 is configured as follows. Specifically, when it is determined that the second radio base station associated with the special identification information is a neighboring radio base station of the first radio base station currently used by the mobile station 300, the access-authorization checking unit 15 sends the service control station 600 identification information of the mobile station and identification information of the second radio base station associated with the special identification information. Thereby, the access-authorization checking unit 15 acquires a determination result of whether the mobile station 300 has access authorization to the second radio base station associated with the special identification information.

Note that, as shown in FIG. 4, the access-authorization checking unit 15 may be configured to manage an access-authorization table in which a "mobile station" is associated with "connectable radio base stations," based on the determination result received from the service control station 600.

Note that the system may be configured as follows if only one piece of special identification information can be set. Specifically, the special identification information managing unit 11 stores a "first radio base station ID" and a "second radio base station ID" in association with each other, and the access-authorization checking unit 15 sends the service control station 600 the identification information of the mobile station 300 and the "second radio base station ID" which is the identification information of the radio base station in association with the "first radio base station ID" which is the identification information of the first radio base station currently used by the mobile station 300, as the identification information of the second radio base station associated with the special identification information.

The guidance information transmitting unit 14 is configured as follows. Specifically, when it is determined that the second radio base station associated with the special identification information is not a neighboring radio base station of the first radio base station currently used by the mobile station 300, the guidance information transmitting unit 14 sends the mobile station 300 specific guidance.

The guidance information transmitting unit 14 is also configured as follows. Specifically, when the determination result received from the service control station 600 indicates that the mobile station 300 does not have access authorization to the second radio base station associated with the special identification information, the guidance information transmitting unit 14 sends the mobile station 300 specific guidance.

As shown in FIG. 5, the standby-frequency managing unit 16 is configured to store the "radio base station ID" and its "standby frequency" in association with each other. Here, the "standby frequency" is a standby frequency for using the radio base station specified by the corresponding "radio base station ID."

The notifying unit 17 is configured as follows. Specifically, when the determination result received from the service control station 600 indicates that the mobile station 300 has access authorization to the second radio base station associated with the special identification information, the notifying unit 17 instructs the mobile station 300 to change the radio communication parameter used by the mobile station 300.

Specifically, the notifying unit 17 is configured to instruct the mobile station 300 to update the radio communication parameter from one used in radio communication with the first radio base station to one used in radio communication with the second radio base station when the determination result received from the service control station 600 indicates that the mobile station 300 has access authorization to the second radio base station associated with the special identification information.

Here, the radio communication parameter is at least one of spreading code, frequency, and timing.

The service control station 600 is configured to store subscriber information. The service control station 600 is connected to the exchange station 500, and is configured to store information on radio base stations to which the mobile station 300 can be connected, as shown in FIG. 4.

Figure 6:
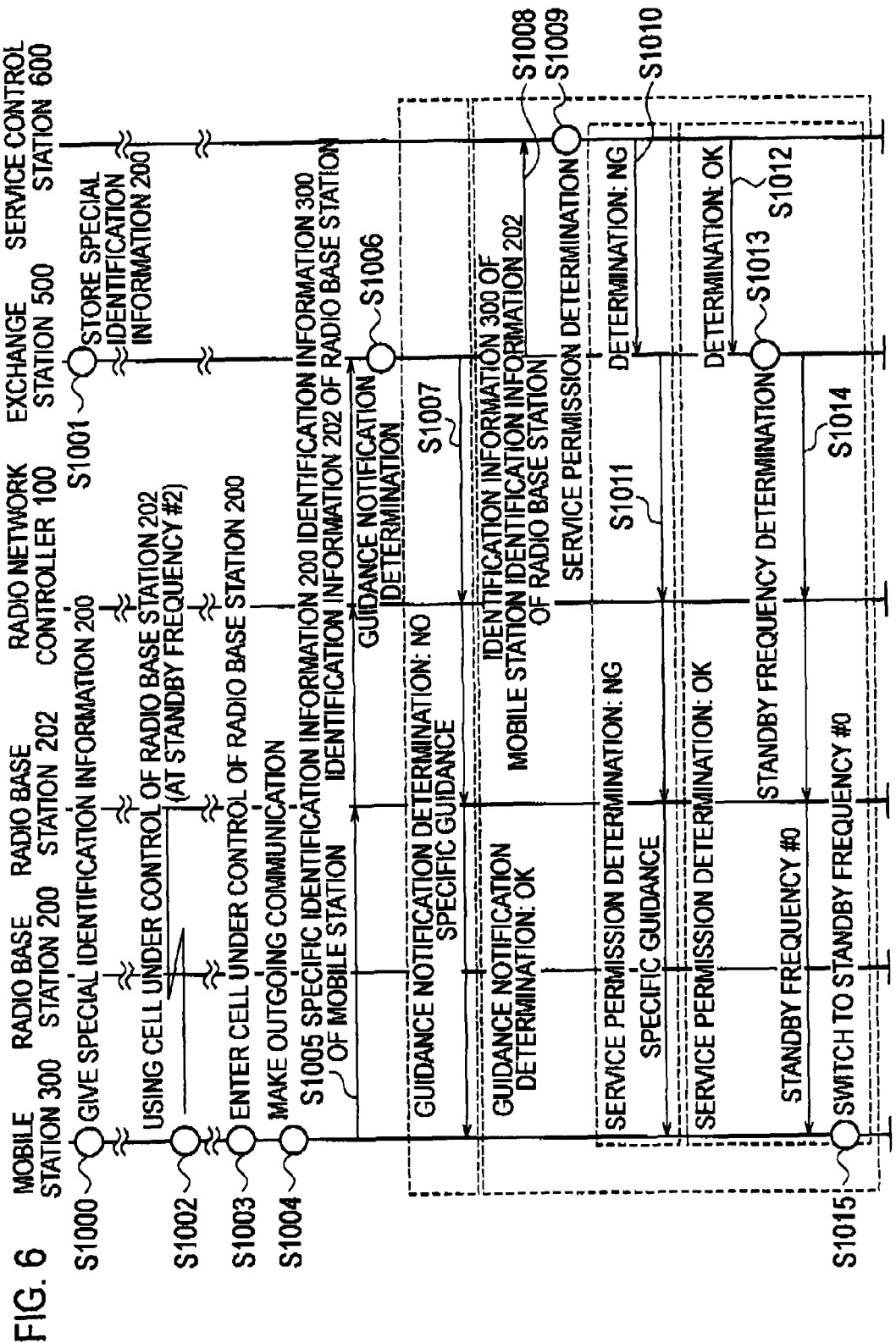
FIG. 6 is a sequence diagram showing operations of the mobile communication system according to the first embodiment of the present invention.

Operations of Mobile Communication System according to First Embodiment of Present Invention With reference to FIG. 6, operations of the mobile communication system according to the first embodiment of the present invention are described.

As shown in FIG. 6, when the owner of the mobile station 300 subscribes to a femto service (i.e., purchases a home radio base station), in Step S1000, the mobile station 300 is given pieces of special identification information (e.g., a specific telephone number) which is to be notified of to use the radio base stations 200 and 201, respectively, and in Step 1001, the exchange station 500 is given those pieces of special identification information.

In the example shown in FIG. 6, "200" is given as the special identification information to be notified of to use the radio base station 200, and "201" is given as the special identification information to be notified of to use the radio base station 201.

In Step S1002, the mobile station 300 is using a cell under the control of the radio base station 202 (i.e., operating at the standby frequency #2). In Step S1003, the owner of the mobile station 300 comes home, for example, entering a cell under the control of the radio base station 200. In Step S1004, the owner operates the mobile station 300 to perform outgoing communication using the special identification information 200.

In Step S1005, via the radio base station 202 and the radio network controller 100, the exchange station 500 receives the special identification information 200, the identification information 300 of the mobile station, and the identification information 202 of the radio base station currently used by the mobile station 300.

In Step S1006, the exchange station 500 refers to the special identification information managing unit 11 to determine whether or not the radio base station 200 associated with the special identification information 200 is a neighboring radio base station of the radio base station 202 currently used by the mobile station 300.

When it is determined that the radio base station 200 is not a neighboring radio base station of the radio base station 202, in Step S1007, via the radio network controller 100 and the radio base station 202, the exchange station 500 notifies the mobile station 300 of specific guidance indicating that it is impossible to standby in the radio base station 200. With that the operations end.

When, on the other hand, it is determined that the radio base station 200 is a neighboring radio base station of the radio base station 202, in Step S1008, the exchange station 500 sends the service control station 600 the identification information 200 of the radio base station associated with the special identification information 200 and the identification information 300 of the mobile station.

In Step S1009, the service control station 600 refers to the access-authorization table shown in FIG. 5 to determine whether the mobile station 300 has access authorization to the radio base station 200 or not.

When it is determined that the mobile station 300 does not have access authorization to the radio base station 200, in Step S1010, the service control station 600 notifies the exchange station 500 of such determination result (NG), and in Step S1010, via the radio network controller 100 and the radio base station 202, the exchange station 500 notifies the mobile station 300 of specific guidance indicating that it is impossible to stand by in the radio base station 200. With that the operations end.

When, on the other hand, it is determined that the mobile station 300 has access authorization to the radio base station 200, in Step S1012, the service control station 600 notifies the exchange station 500 of such determination result (OK). In Step S1013, the exchange station 500 refers to the standby-frequency managing unit 16 to acquire the standby frequency #0 needed by the mobile station 300 to use the radio base station 200. In Step S1014, the exchange station 500 notifies the mobile station 300 of the standby frequency #0 via the radio network controller 100 and the radio base station 202.

In Step S1015, the mobile station 300 thus notified of the standby frequency #0 changes its standby frequency from "#2" to "#0," to thereby change its current cell from the cell under the control of the radio base station 202 (a macro cell) to a cell under the control of the radio base station 200 (a femtocell).

Advantageous Effects of Mobile Communication System according to First Embodiment of Present Invention With the mobile communication system according to the first embodiment of the present invention, when a mobile station enters a cell under the control of a home radio base station, the owner of the mobile station him/herself defines specific identification information for instructing transition to a standby frequency of a femtocell. Accordingly, even an existing mobile station that does not search for a cell of a different frequency unless the reception quality of control signals in a current standby cell becomes or falls below a certain value can preferentially use the femtocell in which high-speed communication, a better charge rate, and/or the like can be expected.

Modifications

Note that the exchange station 500 of the mobile communication system according to the first embodiment described above may be configured as follows. Specifically, upon receipt of the special identification information 200 from the mobile station 300, instead of sending the service control station 600 the identification information 200 of the radio base station associated with the special identification information 200 and the identification information 300 of the mobile station, the exchange station 500 may determine whether the mobile station 300 has access authorization to the radio base station 200 based on the identification information 200 of the radio base station associated with the special identification information 200 and the identification information 300 of the mobile station.

Specifically, it may be configured such that any selected network apparatus 10 determines whether the mobile station 300 has access authorization to the radio base station 200.

Moreover, in the mobile communication system according to the first embodiment described above, at least part of the functions of the exchange station 500 shown in FIG. 2 may be provided to the service control station 600 and/or the radio network controller 100.

Figure 7:
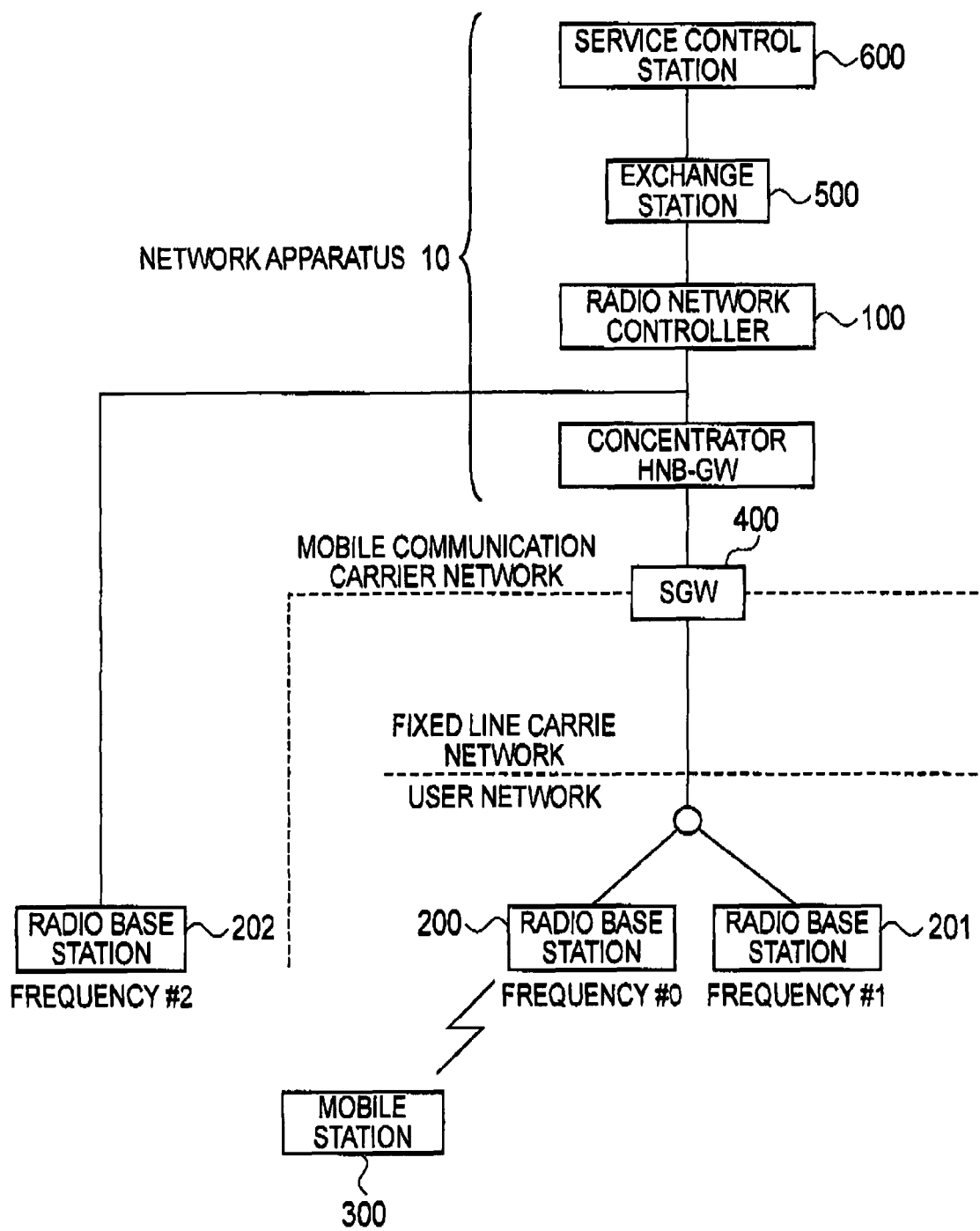
FIG. 7 is a diagram showing the overall configuration of a mobile communication system according to a modification of the present invention.

Further, as shown in FIG. 7, when the mobile communication system according to the present embodiment is a mobile communication system using a W-CDMA scheme, and additionally if a concentrator HNB-GW housing the radio base stations 200 and 201 is provided as the network apparatus 10, at least part of the above-described functions of the exchange station 500 may be provided to the concentrator HNB-GW.

Although the embodiment above has been described, taking the mobile communication system using the W-CDMA scheme as an example, the present invention is not restricted to such mobile communication system, but is also applicable to a mobile communication system using, for example, an LTE (Long Term Evolution) scheme.

Here, as shown in FIG. 8, if the mobile communication system according to the present embodiment is a mobile communication system using the LTE scheme, at least part of the above-described functions of the network apparatus 100 may be provided to each of the radio base stations 200, 201 or to the exchange station 500.

Note that, if the mobile communication system according to the present embodiment is a mobile communication system using the LTE scheme, and additionally if the concentrator HNB-GW housing the radio base stations 200, 201 is provided as the network apparatus 10, at least part of the above-described functions of the network apparatus 10 may be provided to the concentrator HNB-GW.

Incidentally, the operation of the above-mentioned radio base stations 200 to 202, the radio network controller 100, the exchange station 500 and the service control station 600 may be implemented by means of hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Moreover, the storage medium may be integrated into the processor. Additionally, the storage medium and the processor may be provided in an ASIC. The ASIC may be provided in the base stations 200 to 202, the radio network controller 100, the exchange station 500 and the service control station 600. Alternatively, the storage medium and the processor may be provided in the base stations 200 to 202, the radio network controller 100, the exchange station 500 and the service control station 600 as a discrete component.

Hereinabove, the present invention has been described in detail using the above embodiments; however, it is apparent to those skilled in the art that the present invention is not restricted to the embodiments described herein. Modifications and variations of the present invention can be made without departing from the spirit and scope of the present invention defined by the description of the scope of claims. Thus, what is described herein is for illustrative purpose, and has no intention whatsoever to restrict the present invention.

The invention claimed is:

1. A mobile communication method comprising:
   step A of causing a mobile station standing by in a cell under a control of a first radio base station to send identification information of the mobile station and special identification information;
   step B of, upon receipt of the special identification information, determining whether or not the mobile station has access permission to a second radio base station based on the received identification information of the mobile station and identification information of the second radio base station; and
   step C of, when it is determined that the mobile station has access authorization to the second radio base station, instructing the mobile station to change a radio communication parameter used by the mobile station.

2. The mobile communication method according to claim 1, wherein the step B includes:
   step B1 of, upon receipt of the special identification information, causing an exchange station to send a service control station the received identification information of the mobile station and the identification information of the second radio base station; and
   step B2 of causing the service control station to determine whether or not the mobile station has access authorization to the second radio base station based on the received identification information of the mobile station and the identification information of the second radio base station.

3. The mobile communication method according to claim 2, wherein, in the step B1,
   the exchange station determines whether the second radio base station is a neighboring base station of the first radio base station,
   if determining that the second radio base station is a neighboring base station of the first radio base station, the exchange station sends the service control station the identification information of the mobile station and the identification information of the second radio base station, and
   if determining that the second radio base station is not a neighboring base station of the first radio base station, the exchange station sends the mobile station specific guidance.

4. The mobile communication method according to claim 2, wherein, in the step B1, upon receipt of the specific identification information, the exchange station sends the service control station the received identification information of the mobile station and the identification information of the second radio base station in association with any one of the special identification information and identification information of the first radio base station.

5. The mobile communication method according to claim 1, wherein, in the step C, the exchange station instructs the mobile station to update the radio communication parameter from a radio communication parameter used in radio communication with the first radio base station to a radio communication parameter to be used in radio communication with the second radio base station.

6. The mobile communication method according to claim 1, wherein the radio communication parameter is at least one of spreading code, frequency, and timing.

7. The mobile communication method according to claim 1, wherein the special identification information is any one of a specific telephone number, a specific service code of "USSD (Unstructured Supplementary Service Data)," a specific URL, and a specific mail address.

8. A network apparatus comprising:
a notifying unit configured to
   A when special identification information is received from a mobile station, and
   B when it is determined that the mobile station has access permission to a second radio base station based on the received identification information of the mobile station and identification information of the second radio base station,
   C instruct the mobile station standing by in a cell under control of a first radio base station to change a radio communication parameter used by the mobile station.

9. The network apparatus according to claim 8, comprising an access-permission checking unit configured to, when the special identification information is received from the mobile station, send a service control station the received identification information of the mobile station and the identification information of the second radio base station, and to receive a determination result indicating whether the mobile station has access authorization to the second radio base station or not, from the service control station, wherein
   when the determination result received from the service control station indicates that the mobile station has access authorization to the second radio base station, the notifying unit instructs the mobile station to change the radio communication parameter used by the mobile station.

10. The network apparatus according to claim 9, comprising:
   a neighboring radio base station determining unit configured to determine whether the second radio base station is a neighboring base station of the first radio base station, and
   a guidance information transmitting unit configured to send the mobile station specific guidance when it is determined that the second radio base station is not a neighboring base station of the first radio base station, wherein
   when it is determined that the second radio base station is a neighboring base station of the first radio base station, the access-authorization checking unit sends the service control station the identification information of the mobile station and the identification information of the second radio base station.

11. The network apparatus according to claim 9, wherein, upon receipt of the special identification information, the access-authorization checking unit sends the service control station the received identification information of the mobile station and the identification of the second radio base station in association with any one of the special identification information and the identification information of the first radio base station.

12. The network apparatus according to claim 8, wherein the notification unit instructs the mobile station to update the radio communication parameter from a radio communication parameter used in radio communication with the first radio base station to a radio communication parameter to be used in radio communication with the second radio base station.

13. The network apparatus according to claim 8, wherein the radio communication parameter is at least one of spreading code, frequency, and timing.

14. The network apparatus according to claim 8, wherein the special identification information is any one of a specific telephone number, a specific service code of "USSD (Unstructured Supplementary Service Data)," a specific URL, and a specific mail address.

15. A radio base station operating as a first radio base station, comprising:
a notifying unit configured to
   A when special identification information is received from the mobile station, and
   B when it is determined that the mobile station has access authorization to a second radio base station based on the received identification information of the mobile station and identification information of the second radio base station,
   C instruct the mobile station standing by in a cell under a control of the first radio base station to change a radio communication parameter used by the mobile station.

* * * * *